July 16, 1929.  H. B. COLE  1,720,820
HOLDER FOR TOOLS USED FOR TURNING AND PLANING IRON AND OTHER METALS
Filed May 13, 1926
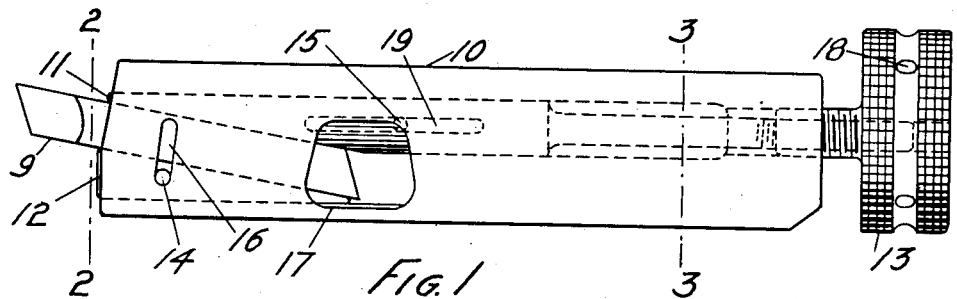
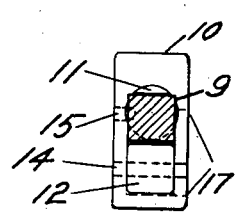 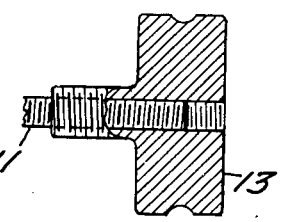 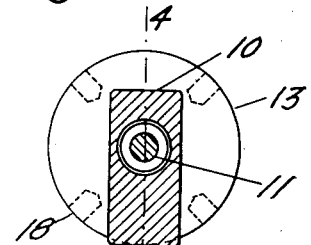
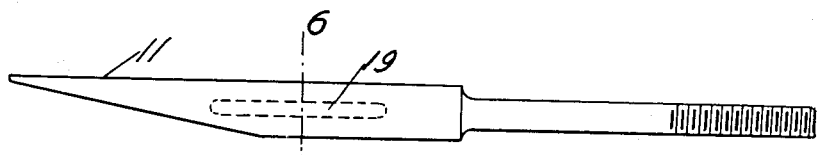
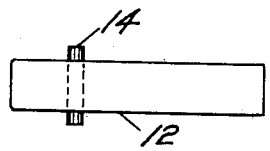
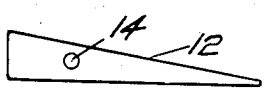
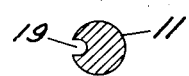
Henry Bruce Cole  INVENTOR.

Patented July 16, 1929.

1,720,820

UNITED STATES PATENT OFFICE.

HENRY BRUCE COLE, OF BENNINGTON, VERMONT.

HOLDER FOR TOOLS USED FOR TURNING AND PLANING IRON AND OTHER METALS.

Application filed May 13, 1926. Serial No. 108,946.

My invention is a fastening to secure tools either at an angle or straight in the same holder.

The objects of my invention are, to provide a secure fastening, to facilitate fastening and releasing tools, to avoid having a large, inconvenient front end, and to adapt the holder to hold tools either at an angle or straight.

My objects are attained by the devices described in the following specification and illustrated by the accompanying drawing. The parts comprising my tool-holder are:—

A. A case, shown with all other parts complete in Fig. 1.

B. A wedge with grooved shank bearing a left hand screw, as in Fig. 5.

C. A tightening-loosening screw with a knurled knob, having a hole inside of it tapped left hand to receive the left hand screw on wedge shank, and its outside threaded right hand to fit a tapped hole in the rear end of the case, shown in Figs. 3 and 4.

D. A movable filler for changing angle of tool insertion, said filler having a pin with projecting ends moving in a slot in the case, shown in Figs. 7 and 8.

E. A screw or pin to enter groove in wedge shank, as shown in Fig. 1, and being 15 in Fig. 2.

Figure 1, in the drawing, is a side view of the holder, showing all parts and a tool in place.

Figure 2, a view of the front end, showing the end of the movable filler (12) a section of the tool (9) on line 2 2 Fig. 1, the end of the fastening wedge (11), and the position of the pin 15 that enters the groove 19 in the fastening wedge 11, Figs. 5 and 6.

Fig. 3, a section of the rear end viewed from the front, taken on line 3 3 Fig. 1, showing the screw at the end of the fastening wedge 11 Fig. 5, inside the tightening-loosening screw in one piece with knurled knob 13.

Fig. 4, a section of the tightening-loosening screw with its knurled knob 13, and a section of the screw at the end of the fastening wedge 11, Fig. 5, inside of it.

Fig. 5, the fastening wedge and screw.

Fig. 6, a section on line 6 6 Fig. 5.

Figs. 7 and 8 are two views of the movable filler.

The numbers for the parts are the same in all views. The tightening-loosening screw that is in one piece with the knurled knob 13 Fig. 4, is shown right hand, and the screw inside of it (in one piece with the fastening wedge 11 Fig. 5) is shown left hand, but both screws may be of the same hand, if they have a different pitch.

Tools can be tightened sufficiently (and released also) by turning the fastening-loosening screw and its knurled knob 13 by hand. (Turning knob to right fastens tool and to left loosens it on diagram shown.) A pin may be used in the holes 18 Fig. 5, but it is seldom necessary.

The movable filler 12, Figs. 1, 2, 7 and 8 can be placed adjoining the wedge 11 Fig. 1 and the tool inserted under it, being then straight with the holder instead of at an angle, as shown in this drawing. This alternative use of filler, enabling tool to be set either straight or at an angle, constitutes its necesity and is the most important part of my invention.

The movable filler 12 Fig. 1, cannot be moved lengthways of tool-holder because the projecting ends of the pin 14 Fig. 7 are in the slot 16 in the case 10 Fig. 1, but it can be moved crossways of tool-holder, the projecting ends of the pin 14 sliding in the slot, and the opening for the tool 9 thus being made either straight or at an angle.

The end of pin 15 Fig. 2 projects into groove 19 Figs. 5 and 6 in the fastening wedge 11 to prevent its turning around, if the knob 13 on fastening-loosening screw is turned while there is no tool in the holder.

The groove is made a little wider than the diameter of pin 15 to allow the fastening wedge to adjust itself to the surface of the tool.

Changing the angle for the opening for the tool by means of the movable filler is an essential part of my invention.

The opening for tool is accessible from the back end through the hole 17 Fig. 1.

I claim:

1. The combination, in a tool-holder, of a case having a threaded hole to receive a tightening-loosening screw; a tightening-loosening screw fitted to the threaded hole in the case, and having a hole tapped to receive a screw on the shank of a wedge; a fastening wedge having a screw on its shank fitted to the tapped hole in the tightening-loosening screw; and a movable filler having a pin with ends projecting into a slot in the case, all substantially as set forth.

2. In a tool holder, the construction of a case or body having an enlarged opening in its end; a cutter in said opening, a wedge-shaped filler adapted to be positioned either above or below the cutter and a suitable clamping member arranged to engage either the cutter or the filler.

HENRY BRUCE COLE.